(12) United States Patent
Silkworth

(10) Patent No.: US 11,473,893 B2
(45) Date of Patent: Oct. 18, 2022

(54) METHOD TO ACHIEVE A TROLLING DEPTH BY ANALYZING LINE ANGLES

(71) Applicant: Duane Adolph Silkworth, Lake Elmo, MN (US)

(72) Inventor: Duane Adolph Silkworth, Lake Elmo, MN (US)

( * ) Notice: Subject to any disclaimer, the term of this patent is extended or adjusted under 35 U.S.C. 154(b) by 477 days.

(21) Appl. No.: 16/714,732

(22) Filed: Dec. 14, 2019

(65) Prior Publication Data

US 2021/0231428 A1    Jul. 29, 2021

(51) Int. Cl.
*A01K 91/20* (2006.01)
*G01B 7/02* (2006.01)
*A01K 91/18* (2006.01)

(52) U.S. Cl.
CPC .............. *G01B 7/026* (2013.01); *A01K 91/18* (2013.01); *A01K 91/20* (2013.01)

(58) Field of Classification Search
USPC ..................................................... 33/720, 719
See application file for complete search history.

(56) References Cited

U.S. PATENT DOCUMENTS

| | | | |
|---|---|---|---|
| 756,887 A * | 4/1904 | Philp .................. | G01F 23/38 33/720 |
| 3,149,419 A | 9/1964 | Koznarski | |
| 3,253,337 A | 5/1966 | Ebert | |
| 3,786,586 A | 1/1974 | Swan | |
| 3,874,108 A | 4/1975 | Connor | |
| 3,959,885 A | 6/1976 | Edmiston | |
| 5,131,165 A | 6/1992 | Benson | |
| 5,187,878 A | 2/1993 | Kuttner | |
| 7,113,449 B2 | 9/2006 | Fairbairn | |
| 7,161,872 B2 * | 1/2007 | Kuriyama .............. | A01K 89/00 367/111 |
| 10,555,513 B1 * | 2/2020 | Rychnovsky ............ | G01B 5/18 |
| 2005/0200836 A1 | 9/2005 | Scorvo | |
| 2006/0191185 A1 * | 8/2006 | Hansen .................. | A01K 91/20 43/43.13 |
| 2017/0059314 A1 | 3/2017 | Braunberger | |

OTHER PUBLICATIONS

Ray Rychnovsky, The Trailer's Handbook, 1998, Frank Amato Publications, Portland, Oregon pp. 9, 64, Appendix.
(Continued)

*Primary Examiner* — Christopher W Fulton

(57) ABSTRACT

A method is described to compute and display the line length required to troll a fishing rig at a desired depth. Line lengths and respective line angles measured at the surface are used to calculate an approximation to the actual underwater curve profile of the trolled fishing line, which is used to determine the line length required to troll at a desired depth or to determine the resulting depth for a specified line length. An embodiment is described which requires only a smartphone and software beyond standard trolling fishing equipment. This embodiment uses the embedded sensors of the smartphone to collect fishing line angle measurements. Also described is a method and devices to automatically collect the line angles and line lengths using a wireless fishing line inclinometer device and a wireless line counter, which is especially useful and convenient when software is implemented on a mounted marine electronics unit.

4 Claims, 6 Drawing Sheets

(56) References Cited

OTHER PUBLICATIONS

Figure 1:
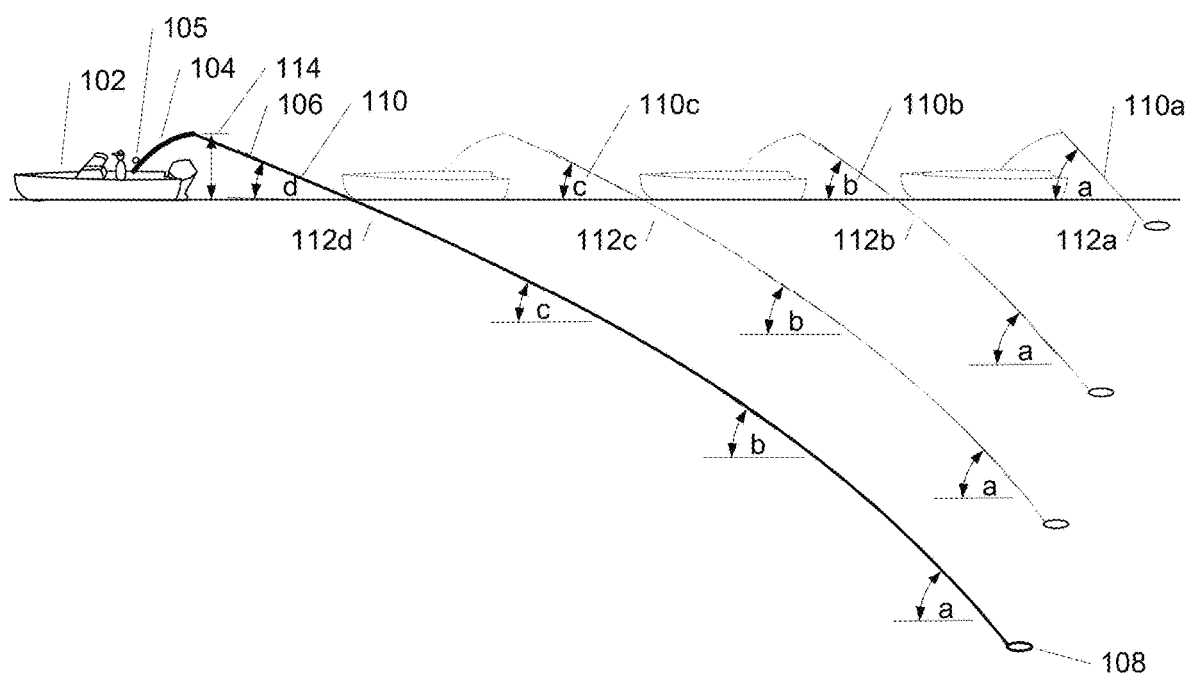

G. Spolek Sink depth of trolled fishing lines—Mechanical & Materials Engineering, Portland State University, Portland, USA.
LivePrecise Trolling depth estimator http://liveprecise.com/tdepy.html.
Troll Master Lure Depth Locator https://play.google.com/store/apps/details?id=appinventor.ai_trevor_lewis.TrollMaster&hl=en_US.
Dipsy Diver, Luhr-Jenson https://www.rapala.com/on/demandware.store/Sites-rapala-Site/default/Product-GuidesAndManuals?source=downloads%2fluhrjensen%2fDipsy_Charts_English%2epdf.
Lead Core Line Precision Trolling Depth Calculator https://play.google.com/store/apps/details?id=trolling.leadcore.depth, http://www.webeggheads.com/.
SmartTroll—http://smarttroll.com/.
https://deeptrout.wordpress.com/2010/10/17/measure-the-catenary-depth-of-your-bait/Measure the Catenary Depth of Your Bait Oct. 17, 2010.

* cited by examiner

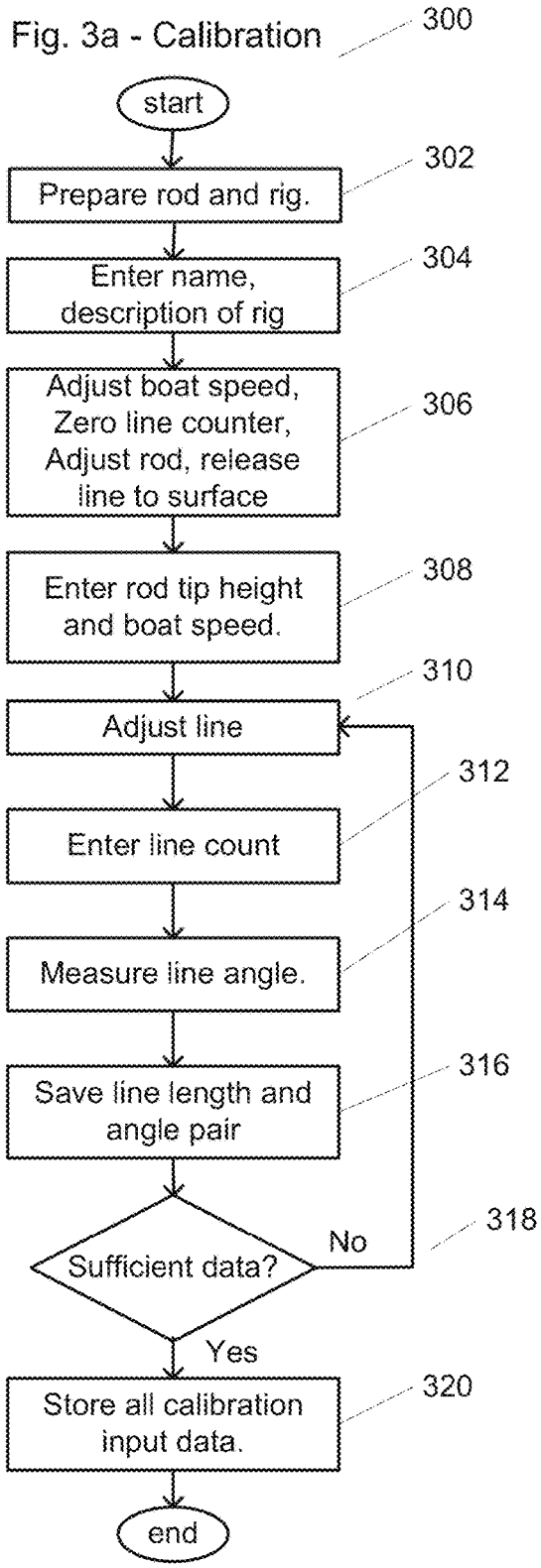
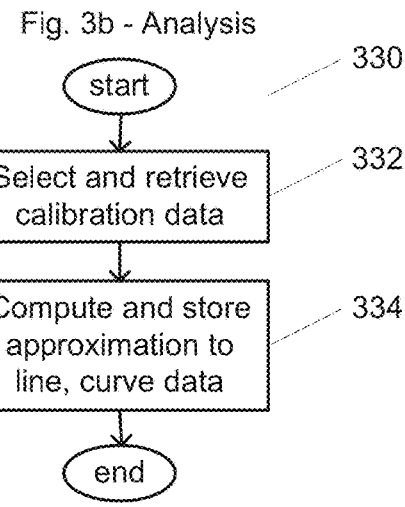
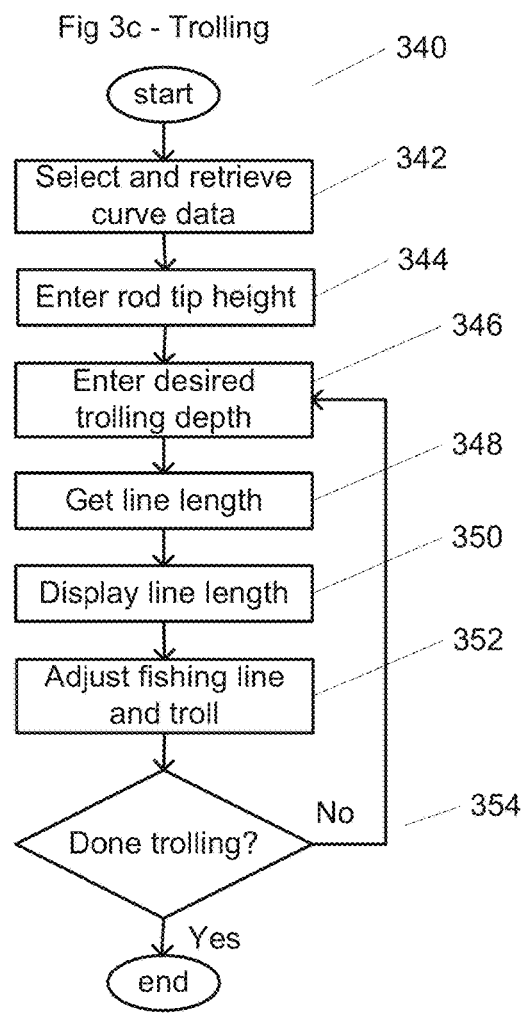

METHOD TO ACHIEVE A TROLLING DEPTH BY ANALYZING LINE ANGLES

RELATED APPLICATIONS

None

FEDERALLY SPONSORED RESEARCH

None

TECHNICAL FIELD

The present invention relates to fishing methods, and more specifically to methods for controlling trolling line length and depth.

BACKGROUND

When fishing by the method of trolling, in which a lure, bait, weights, and other terminal tackle on a long line is pulled behind a moving boat, it is desirable to troll the lure at a particular predetermined depth. Using a fish finder, thermometer, other equipment, knowledge of the bottom depth, or experience, it may be determined or surmised that target fish are holding at a particular depth so that it is advantageous to present the trolled lure at or near that same depth.

However, in a moving boat, it is not straightforward to know the actual depth of the lure when it is underwater or to determine how much line one must let out to cause the lure to be trolled at a given desired depth.

Using a line-counting reel, or by counting handle revolutions or level-winder traversals, using a multicolored line, or other techniques, it is feasible to measure the amount of line that is let out behind the boat. However, the resulting depth is unknown.

A common technique is to troll over a bottom of a known depth, and to let out enough line so that the lure touches bottom, which is detected by increased and variable line tension. By performing this over several known depths and recording the line lengths, practical knowledge of the performance of the particular rig can be accumulated. However, this technique is time consuming, and risks snagging and losing the lure.

Some anglers use rules of thumb like the "Rule of Fives." When trolling at five mph, with 50 pound test line and five ounces of weight, set to 50 feet behind the boat, your lure will run about five feet under the surface. This rule can be mentally adjusted for small variations but is not as useful when using significantly smaller or larger weights, slower or faster speeds, or varying lures.

Several prior patented or described devices, by Koznarski, Ebert, Swan, Connor, Cheatham, Kuttner, Scorvo, Braunberger, others, provide a means to measure the angle of the line, and supply a conversion table to convert the angle and line length to a depth, or to convert the angle and desired depth to a length. However, these devices and methods over-simplify by using a single angle, usually the angle of the unsubmerged line portion when the line is fully deployed, and assume that the underwater line profile is a straight line. These devices do not account for the actual curved line profile of the submerged line, and so they are inaccurate. In addition, some of these particular devices are cumbersome or imprecise in actual use.

The line profile is a continuous and smooth but complex curve that depends upon many factors, including:

drag, lift or diving force of the lure and tackle, which depends on the trolling velocity and the weight and shape of the lure, bait, leaders, sinkers, swivels, connectors, and other terminal tackle.

the drag and lift of the line at each point of the line, which depends on velocity, weight, length, diameter, angle of attack, slipperiness, surface condition of the line, and other factors.

environmental factors such as wind and wave action, vibrations from the boat motor, and fouling by vegetation or debris, which also may affect drag or lift.

It is complicated and error-prone to know or measure all of the underlying physical factors accurately and to calculate the line profile curve based upon them. However, some prior art implemented as software programs do attempt to obtain some of these underlying factors and to calculate or adjust the depth or line profile curve based on principals of physics. Examples are LlvePrecise and Trollmaster.

In his book The Troller's Handbook, 1998, Ray Rychnovsky describes the physics of a trolled fishing line, and publishes multiple mathematically rigorous and tested graphs of trolling depth versus weight, speed, line diameter, and line length. These graphs cover the major factors for lines with sinker weights and light low-drag lures, but do not address the performance of diving lures.

The line profile of a heavy line, like lead core or steel line, with light lures like trout flies, is approximately a straight line, so calculating depth is straightforward. See Rychnovsky, and Spolek. The Lead Core Line Precision Trolling Depth Calculator, a smartphone app, calculates depths versus line lengths, but is limited to using particular leadcore lines.

Some lure and tackle manufacturers, have published depth charts or tables of their particular products, such as Dipsy Diver. These tables are limited to particular products rigged with specified line types and terminal tackle.

Precision Trolling uses directly observed experimentally tested data representing length vs. depth curved line profiles for many particular lure and line combinations, with adjustments for factors like speed and weights. This data has been previously published and sold in paper form, and is now provided as data for a smartphone app. This technique relies on data that is accurately and directly observed, but that is expensive to generate, and is limited to the specific lure types that have been tested and for which data is provided. Documentation and an accompanying video of the Precision Trolling app show this data being collected by a scuba diver with a floating ruler while another person in a boat trolls a specific lure past him, repeatedly at different speeds and with different line lengths. The Precision Trolling app references patent U.S. Pat. No. 7,113,449 by Fairbairn which claims "1. An electronic fishing aid comprising: a user interface having user inputs and a display; a data structure containing data relating to variables including lures, depths and line lengths;" Fairbairn describes a system in which a database of the attributes of multiple individual lure types is provided through external means, and is optionally adjusted based on speed, weight, line type, and other factors.

Also, there are electronic devices such as SmartTroll, which attach to the terminal tackle and transmit real-time depth and temperature data to a receiver onboard the boat. These devices are expensive, and prone to be lost especially if attached to lightweight fishing lines. Also, such a device itself potentially affects the performance of the trolled terminal tackle itself.

All of the devices and techniques described above have serious limitations. In discovered prior art there is no universal, accurate, convenient, rapid, versatile, and inexpensive method or device which helps an angler determine the depth of an arbitrary trolled fishing rig.

PRIOR ART REFERENCES

Patents

| Number | Issue Date | Patentee | Title |
| --- | --- | --- | --- |
| U.S. Pat. No. 3,149,419 | 1964 Sep. 22 | Frank R Koznarski | Method of and apparatus for trolling |
| U.S. Pat. No. 3,253,337 | 1966 May 31 | Edward A Ebert | Line depth indicating device |
| U.S. Pat. No. 3,786,586 | 1974 Jan. 22 | Edward J. Swan | Method and article for determining how much line to use when trolling |
| U.S. Pat. No. 3,874,108 | 1975 Apr. 1 | Loly V Connor | Device for determining the depth of a trolling plug |
| U.S. Pat. No. 3,959,885 | 1976 Jun. 1 | Glen P. Edmiston | Trolling depthometer |
| U.S. Pat. No. 4,586,286 | 1986 May 6 | James L. Cheatham, Jr. | Outrigger lure depth control |
| U.S. Pat. No. 5,187,878 | 1993 Feb. 23 | James P. Kuttner | Angular Depth Gauge |
| U.S. Pat. No. 7,113,449 | 2006 Sep. 26 | Scott R. Fairbairn | Marine electronics with lure depth analyzer gear and associated software, underwater device and data communication medium |

Patent Application Publications

| US20050200836A1 | 2005 Sep. 15 | Sean Scorvo | Fishing system |
| --- | --- | --- | --- |
| US20170059314A1 | 2017 Mar. 2 | Braunberger | Auto Depth Locator |

Papers, Publications

The Troller's Handbook, 1998, Ray Rychnovsky

Sink depth of trolled fishing lines—G. Spolek, Mechanical & Materials Engineering, Portland State University, Portland, USA Commercial Products LivePrecise Trolling depth estimator, a web page and a smartphone app.

Troll Master Lure Depth Locator, a smartphone app.

Dipsy Diver, Luhr-Jenson, a diving planer with a depth table.

Lead Core Line Precision Trolling Depth Calculator, a smartphone app.

SmartTroll, a device attached to a downrigger.

SUMMARY

This application describes a new method which allows an angler in a boat to determine and use the actual relationship between line length and depth for the exact rig in use, without any predetermined rig-specific data. In this method, the angler measures a series of line length segments and line angles of the active trolling rig, and uses a computing device and software along with that measured data to compute and display the line length needed to troll the fishing lure at any desired depth.

In a calibration phase, the method measures and records the angle of incidence between the water surface and the actual rigged trolling line, at a plurality of line lengths.

In an analysis phase, the software on the computing device calculates a curve data structure which approximates the actual curved trolling line profile.

In a trolling phase, after calibration and analysis, the software on the computing device presents a user interface in which the angler can specify the desired depth, uses the curve data structure to compute the line length which is required to troll at that depth, and displays the required length to the angler.

This method does not rely on knowing the specifications of the physical factors or the mathematics of the physics which depends on those factors. It does not rely on external data for specific lure types. It also does not rely on any other external data provided by other parties. It relies only on the line lengths and angles of the line observed with the tackle and conditions in actual use. This is possible because the physical factors controlling drag, lift and downforce are not actually significantly dependent on depth. The angle of the tangent to the line at a given point of the line, and thus the curve profile of the whole portion of a trolling line below the given point on the line, does not significantly change as the line is lowered deeper into the water. By measuring the line angle when a given point on the line is at or slightly below the surface, we are also effectively measuring the approximate tangent line angle at that point of the fishing line when that point is later submerged to any depth. These angles and corresponding line lengths are used to compute an approximation to the full profile of the trolled fishing line interpolated over the measured line lengths. See FIG. 1.

This application describes several embodiments of a new process that uses particular devices and software to exploit the phenomenon described above to determine the relationship between real depth and line length with more than sufficient accuracy to support the pursuit of fishing. Some of these embodiments provide an economical, accurate, rapid, convenient, and versatile process with which a trolling angler can know how to present any trolled lure or bait at the desired depth where fish are most likely to perceive and strike the lure or bait.

DRAWINGS—FIGURES

FIG. 1—Schematic of a boat and fishing gear during a calibration phase of the present invention, showing line angles associated to multiple different line lengths.

Figure 2A:
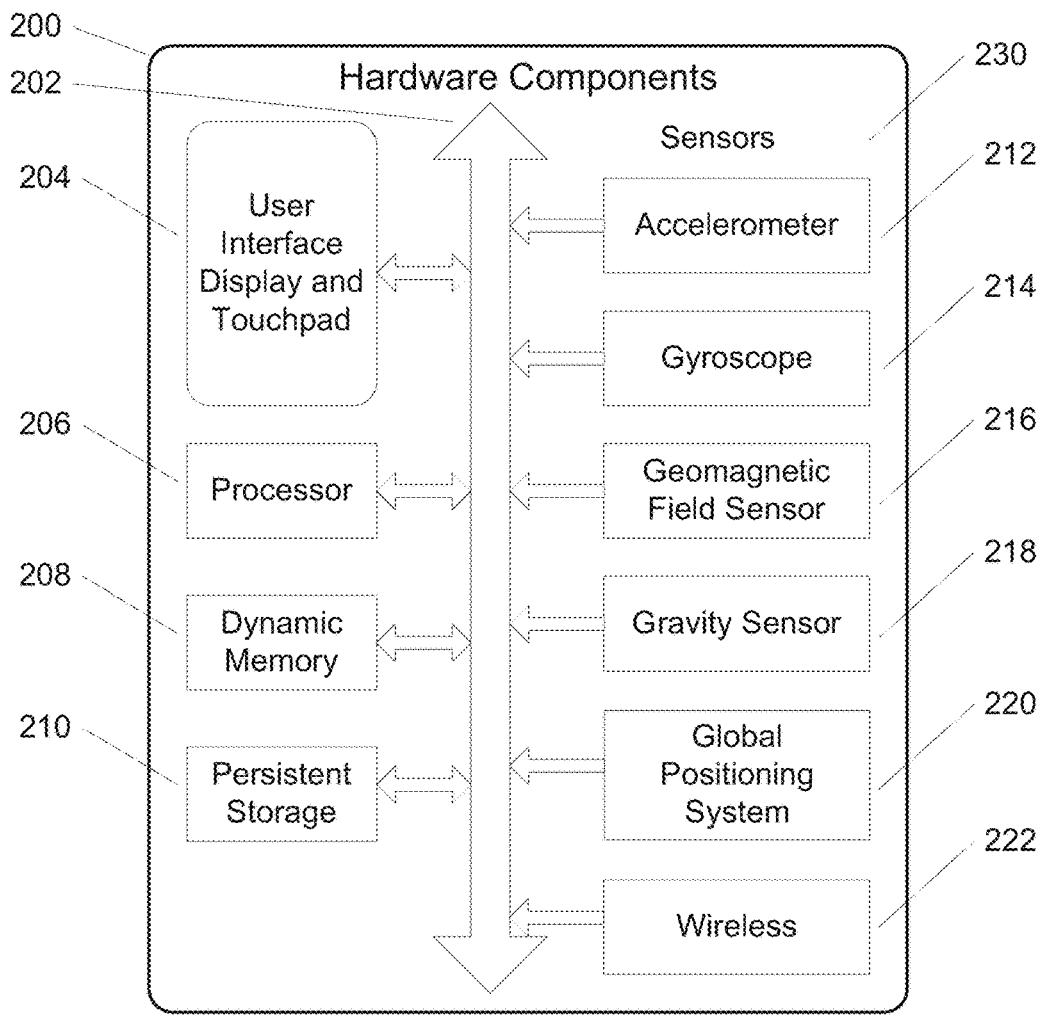

FIG. 2a—A high-level logical hardware component diagram showing computing device components used by embodiments of this method.

Figure 2B:
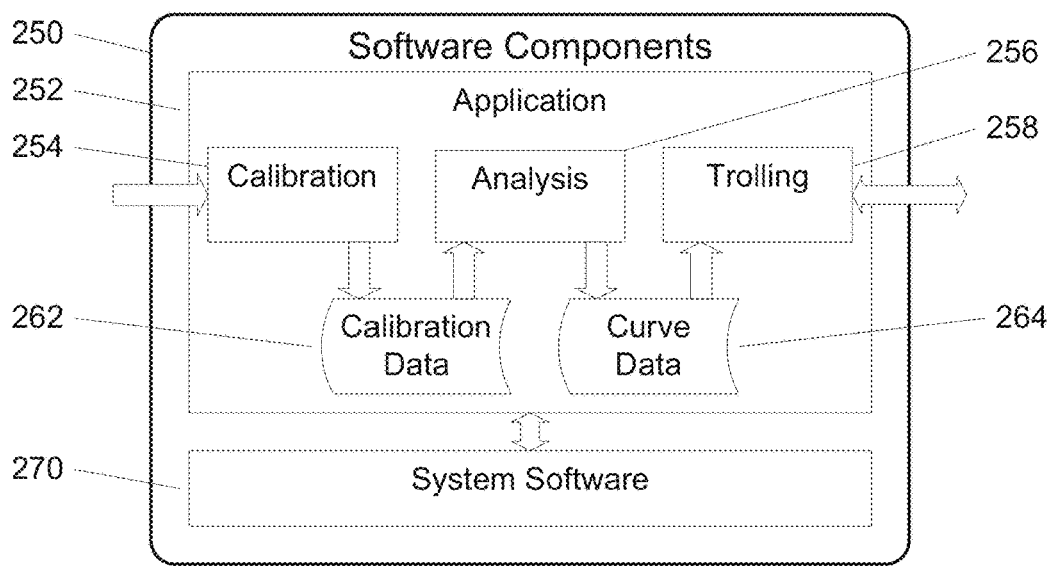

FIG. 2b—A high-level software module block and data flow diagram.

FIG. 3a, 3b, 3c—Flowchart of an embodiment of the three phases of this method, showing actions by the angler and interactions with the software.

Figure 4A:
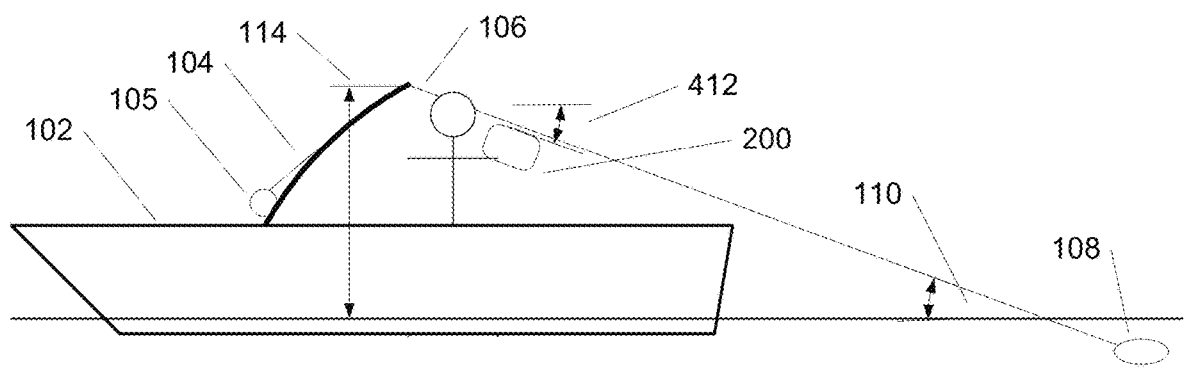

FIG. 4a—Schematic representation in side view of an angler aligning a handheld computing device to a fishing line while measuring an angle.

Figure 4B:
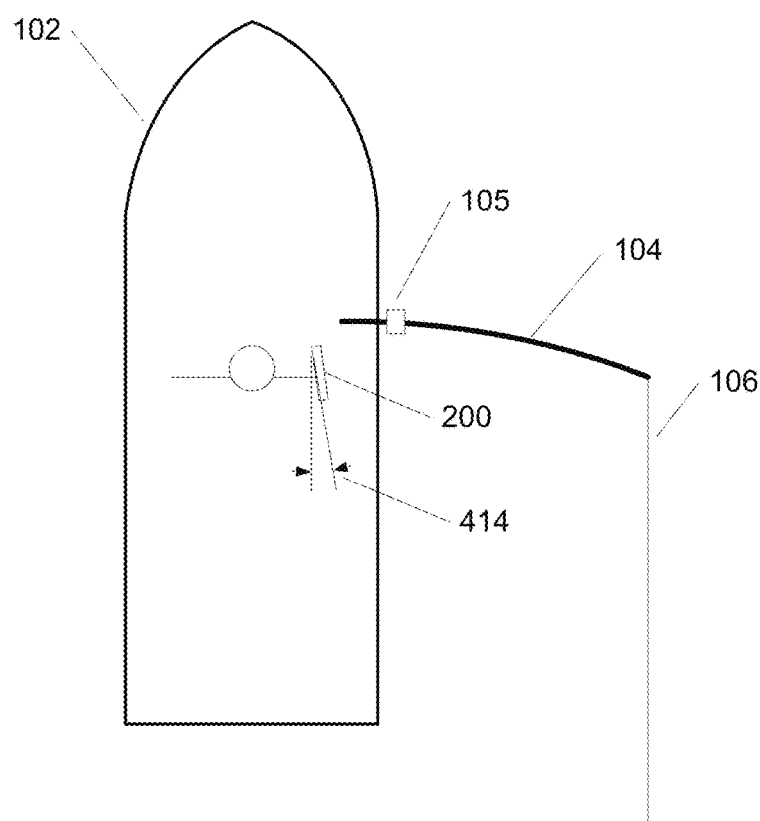

FIG. 4b—Schematic representation in top view showing the angler aligning a handheld computing device to the fishing line while measuring an angle.

Figure 5:
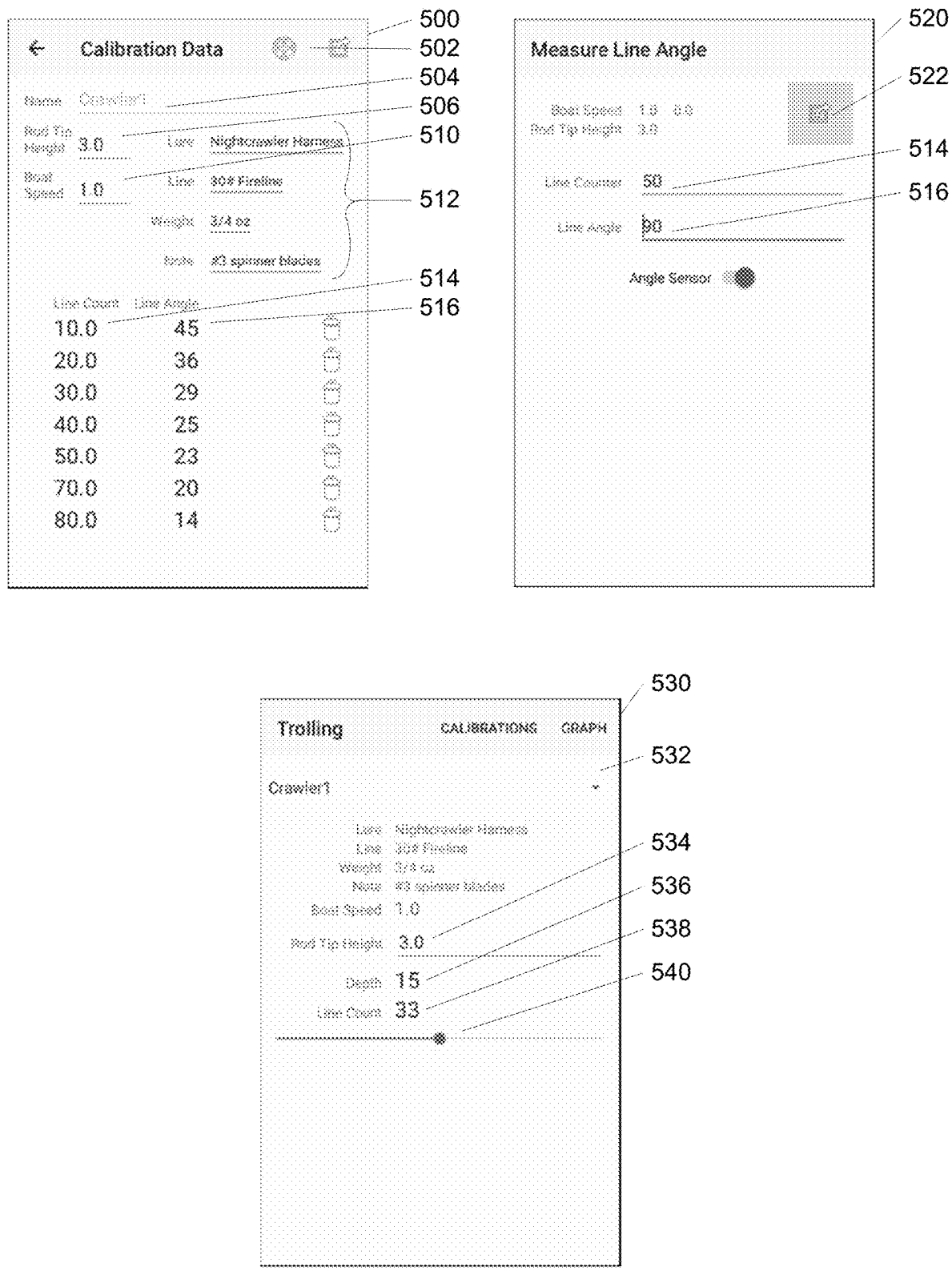

FIG. 5 —Mockups of user interface forms, describing data, interactions and processing.

Figure 6A:
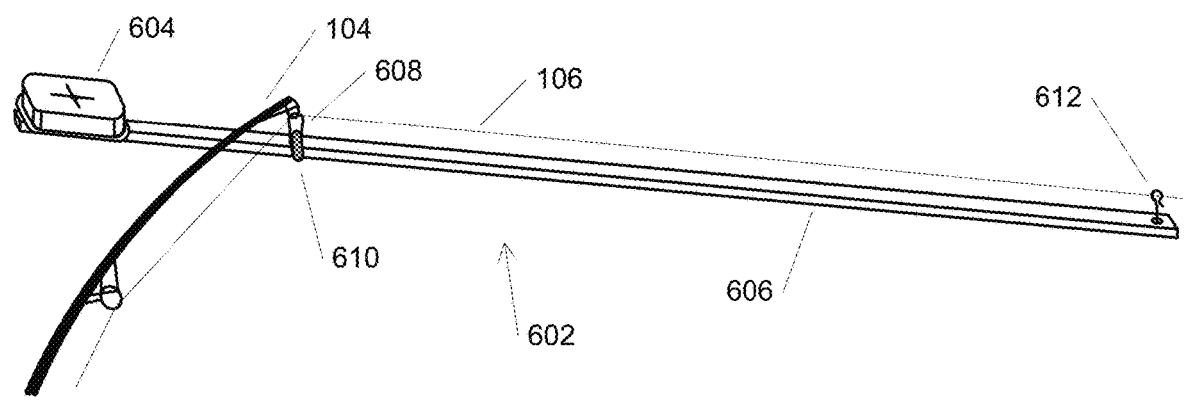

FIG. 6a—Drawing of a device incorporating a wireless electronic inclinometer, mounted on a fishing rod to measure fishing line angles.

Figure 6B:
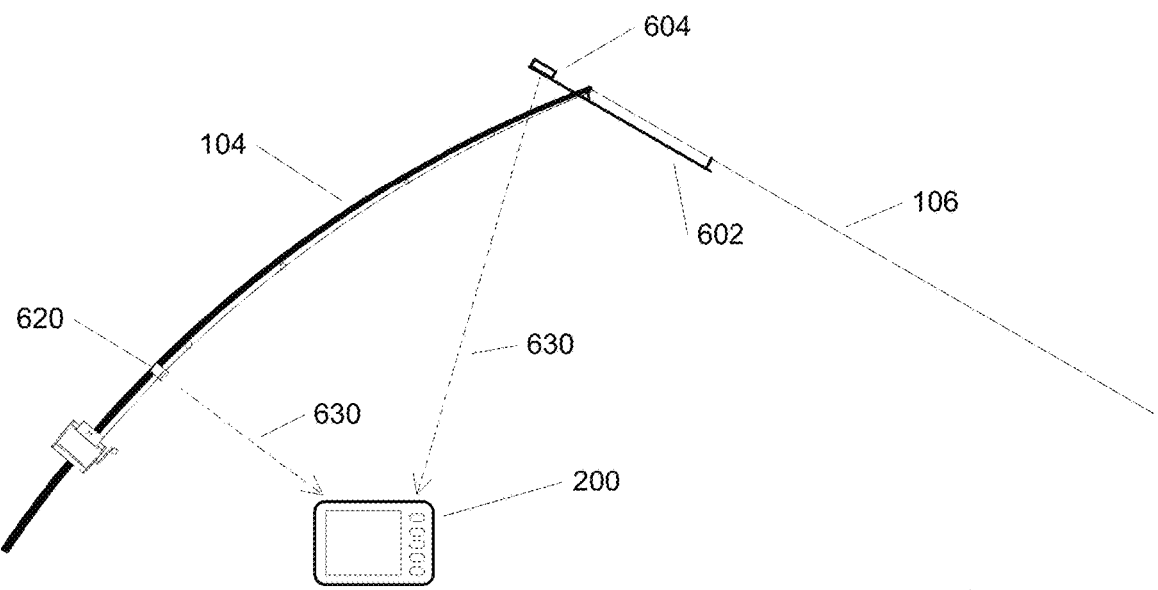

FIG. 6b—Schematic representation of a wireless fishing line inclinometer and a wireless line counter in use to measure line angles and line lengths.

Figure 6C:
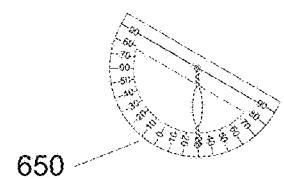

FIG. 6c—A simple handmade prior art inclinometer, adequate to measure line angles.

DRAWINGS—LIST OF REFERENCE NUMERALS

102—Boat, with motor and trolling rod holder
104—Fishing Rod
105—Fishing Reel with line counter
106—Fishing Line
108—Terminal Tackle
110—Line Angle with respect to horizontal
112—Submerged fishing Line Length
114—Rod Tip Height
200—Hardware components of portable angle computing device
202—Data bus interconnecting the components
204—Display and Touchpad, providing the device's user Interface
206—Processor
208—Dynamic Memory
210—Persistent Storage
212—Accelerometer
214—Gyroscope
216—Geomagnetic Field Sensor
218—Gravity Sensor
220—Global Positioning System (GPS)
222—Wireless Radio
230—Sensors
250—Software components on portable depth computing device
252—Application
254—Calibration module
256—Analysis module
258—Trolling module
262—Calibration data
264—Curve data
270—System software
412—Angle of device with respect to horizontal
414—Angle of device with respect to boat's direction of travel
500—UI for calibration
502—Button to add a new line length and angle
504—Name of the rig configuration
506—Rod tip height above the water surface during configuration
510—Boat speed
512—Description of the rig configuration
514—Line length as shown by line counter
516—Line Angle
520—UI for measuring line length and angle
522—Button for accepting the displayed length and angle
530—UI for trolling
532—Dropdown list to select a rig by name
534—Current rod tip height during trolling
536—Desired predetermined depth
538—Line count value required to reach depth
540—Slider to adjust depth and line count
602—Wireless fishing line inclinometer
604—Wireless electronic inclinometer
606—Rigid bar
608—Hangar
610—Sliding fastener
612—Line guide
620—Wireless electronic line counter
630—Wireless signal
650—Mechanical inclinometer

DETAILED DESCRIPTION

A Trolled Line at Different Depths—FIG. 1

FIG. 1 shows a schematic of a trolling boat 102, moving right to left. At each position, more line is let out. At the first position, a short, measured length 112a of line is released such that the terminal tackle 108 is fully submerged, and the first angle 110a with respect to horizontal is measured as value a. At the next position, a longer measured length 112b of line is released, and the angle 110b is measured at the surface as value b. The angle of the line 110a at the first point of the line is still value a. Similarly, at the remaining boat positions, the measured angles 110b, 110c remain essentially unchanged as their line point is submerged further. In the final position, we can consider the line 110 as several joined curved line segments each of a known length and with different known angles at the start and end of each segment. This is enough information to fit a mathematical curve to each of these segments with these constraints, and thus to interpolate the xy coordinate of each point of each curved segment and the distance along the curve to each point.

Apparatus FIG. 1, 2a, 2b

One embodiment of this method may be performed with the following apparatus:

A boat 104 with a motor (not shown) and a trolling rod holder (not shown).

A fishing rod 104 and reel 105 with a line counter, rigged with line 106 and terminal tackle 108. Terminal tackle 108 is comprised of everything rigged near the end of the line, such as weights, leaders, connectors, swivels, attractors, hooks, lure and/or bait. The full rig is comprised of the rod and reel 104, line 106, and terminal tackle 108.

A handheld portable computing device 200, comprised of a user interface 204, processor 206, dynamic memory 208, persistent data storage 210, sensors 230, global positioning system (GPS), and standard operating software.

Application software 250 and system software 260 installed and executed on the handheld portable computing device 200.

Applicable Computing Device Components—FIG. 2a

FIG. 2a shows high level hardware used in the description of an embodiment of the present invention.

The hardware diagram FIG. 2a shows a block diagram of a computing device 200 with a user interface 204, processor 206, dynamic memory and persistent storage. These components are found in essentially every computing device. A computing device with these components, and without the additional sensors 230 shown, can enable some of the alternative embodiments of this process. A typical marine electronics unit, such as a fish-finder or chart plotter also has these components, and with appropriate software or firmware, can, with or without additional devices, support some described embodiments of the present invented method A computing device capable of enabling the first described embodiment of the present invented method also has sensors 230: an accelerometer 212, a gyroscope 214, a geomagnetic field sensor 216 (compass), a gravity sensor 218, a global positioning system 220 (GPS), and wireless radio 222.

The first described embodiment requires the ability to detect the positional orientation of the device 200 with respect to horizontal. Depending on the device design, this information is often obtained by the system using more than one of the above sensors 230.

The global positioning system 220 is not used in at least one alternative embodiment.

At least one embodiment uses a short-range wireless system 222, such as Bluetooth.

Each of the components itemized in this section and FIG. 2a is standard equipment in a typical modern smartphone.

Software Components—FIG. 2b

FIG. 2b shows high level software used in the description of an embodiment of the present invention.

Specific application software is required to enable all embodiments of the present invented method. This software has three modules to implement corresponding phases of the method described later in the Operation section and flowchart FIG. 3.

A calibration module 254 obtains descriptive and measured information from the angler and sensors 230, and saves a set of calibration data 262.

An analysis module 256 uses the calibration data 262 to compute the curve data 264.

A trolling module 258 is used by the angler while actively fishing. It uses the curve data 264 to provide useful information to the angler.

The application 252 relies on functionality provided through the standard system software 270.

Software User Interface—FIG. 5a, 5b, 5c

The user interface panels shown in FIGS. 5a, 5b, and 5c and referenced in this specification are one of many possible embodiments of a user interface for the software and hardware of the described process, as it could be implemented for a smartphone. Other user interface embodiments will differ based on platform and technology. A simple prompting-text program could be designed to accept the calibration data, and the trolling phase inputs, and results could be displayed as simple textual output. Or, specialized hardware could accept the calibration data automatically with the aid of a minimal interface with a few hardware buttons and devices.

Software Analysis Module and Curve Data

The analysis module 258 may derive and represent curve data 264 in one of many well-known mathematical forms, using various types of curve equations or numerical algorithms. It is not necessary to use a curve equation which exactly models the physics involved, especially if the calibration data is reasonably closely spaced, given the limited accuracy needed and the size of inevitable measurement error. The descriptions of the method in this specification, the flowcharts FIGS. 3a, 3b, 3c, and user interface in FIGS. 5a, 5b, 5c provide enough detail for a skilled software engineer with mathematical education or advice to make appropriate design choices and implement a full embodiment of the described software.

Inclinometers

An inclinometer is a device which can be used to measure the inclination of a line or plane with respect to the horizontal. Each embodiment of the method requires such a means to measure the fishing line angle 110. Several inclinometers are described.

Mechanical Inclinometer

A simple handmade mechanical inclinometer can be easily constructed with a protractor and a hanging weight. See FIG. 6c.

Embedded Inclinometer Sensors

A portable computing device 200 may have sensors and software which enable the portable computing device 200 to be used as an inclinometer.

Wireless Fishing Line Inclinometer

An embodiment of a wireless fishing line inclinometer device is shown in FIG. 6a, and is described here. A commercially available wireless electronic inclinometer 604, such as a WitMotion BWT61CL or similar, which contains sensors and a small battery, and which transmits its orientation angles over a short-range wireless protocol such as Bluetooth, is attached near one end of a lightweight rigid bar 606. A clip or hangar 608 is attached to the bar 606 with a sliding fastener 610 at the balance point of the device 602. The fastener 610 may be repositioned as needed to balance the device 602. A releasable line guide 612 is attached near the other end of the bar 606. The hangar 608 and line guide 612 are dimensioned and aligned so that when the hangar 608 is attached to and suspended from the rod tip guide of the fishing rod 104 and the line guide 612 is clipped onto a taut fishing line 106, the wireless electronic inclinometer 604 is parallel to the fishing line 106 at reasonable angles of the line 106. The whole wireless fishing line inclinometer 602 is relatively lightweight, and its weight is entirely borne through the hangar 608 by the fishing rod 104, and no significant weight is borne by the fishing line 106, so that the angle of the line 106 is not significantly disturbed by the wireless fishing line inclinometer 602.

Many variant embodiments are possible. The bar 606 may be collapsible or telescopic to save space when not in use. The case holding the electronics of the commercial inclinometer 604 may be integrated with the bar 606 as a single piece. The hangar 610 may be permanently fixed or incorporated with the bar 606 at the balance point of the device 602.

Operation—FIG. 3a, 3b, 3c

FIGS. 3a, 3b, and 3c together is a high-level flowchart showing the process steps undertaken by the angler and the high-level operation of the application software in the execution of the first described embodiment of the method.

Calibration Phase—FIG. 3a

Calibration—Preparation and Initial Data Entry

The angler prepares the fishing rod 104, reel 105, line 106, and other terminal tackle 108 exactly as will be used to actually fish. (302)

The angler invokes the user interface for calibration 500, enters a name 504 for this configuration of the fishing rig, and optionally enters descriptive information 510 such as the lure, bait, line type, weight. The name 504 and descriptive information 510 are not used in calibration or analysis except to allow the angler to identify and document the rig. (304)

The angler or a second person sets the boat 102 running in a straight line at the desired trolling speed over water that is deeper than the depths at which the terminal tackle 108 will be trolled. The angler resets the line counter of the reel 105 so that it reads zero when the terminal tackle 108 is at the rod tip. The angler places and adjusts the fishing rod 104 and attached reel 105 in a rod holder. The angler releases a length of line 106 from the reel 104 so that the terminal tackle 108 is submerged somewhat below the surface and is running true. (306)

The angler enters the height 114 above the water surface of the rod tip into the rod tip height field 506. (308)

The calibration module 254 uses the device's GPS sensors 220 to determine the boat speed 510. The boat speed 510 is recorded and shown as a convenience so that a consistent speed may be achieved throughout calibration and trolling, but is not otherwise used. (308)

Calibration—Measure Line Length

The angler releases or recovers the line 106 with the reel 105 to prepare for a measurement. One measurement should be taken with the terminal tackle 108 only slightly below the surface, but deep enough so that it is running true and undisturbed by the water surface. Other measurements should be taken with reasonably spaced different line lengths.

By pressing a button 502, the angler invokes the user interface for measuring line length and angle 520 and enters the current line length shown by the line counter of the reel 105 into the line length field 514. The analysis module software accounts for the unsubmerged portion of the line above water, so the angler always enters and sees the line length as displayed by the line counter. (312)

Calibration—Measure Line Angle with Handheld Computing Device FIG. 4a

The angler measures the angle of the line with respect to horizontal 110 with the handheld computing device 200 with embedded sensors 230. This provides a convenient and automatic way to measure and record the angle 110 with no additional equipment or manual data entry. (314)

FIG. 4a shows how this is performed by holding the handheld computing device 200 near and aligned parallel to the line 106, or some distance from the line 106 and not over the water and parallel to the boat's travel motion. The angler visually aligns the edge of the device 200 to the portion of the fishing line 106 evident above the surface of the water.

The calibration module 254 uses the interfaces of the system software 270 for the accelerometer 212, gyroscope 214, and geomagnetic sensor 216, and/or gravity sensor to obtain the angle 412 of the device 200 with respect to horizontal, and updates the line angle field 516. While the device 200 and the line 106 are aligned, the angler presses the button 522 for accepting the displayed line length 514 and line angle 516.

If the device 200 is exactly parallel to the direction of the boat's travel motion and is exactly visually aligned to the fishing line 106, the angle 110 of the line 106 is the same as the angle of the device 412.

Optional—Angle Correction FIG. 4b

FIG. 4b shows a means to adjust for the manual error introduced if the angler does not hold the device 200 exactly parallel to the boat's direction of travel motion. The calibration module 254 applies a correcting transformation matrix derived by comparing the direction of the boat's travel motion with the orientation of the device 414, so that the true angle 110 is determined.

Calibration—Save and Repeat

The calibration data pair, consisting of the line length 514 and angle 516, is added to the saved calibration data 262. (316)

The angler releases or recovers a predetermined additional length of line 106 with the reel 105, and repeats measuring and recording the line length 514 and line angle 516 multiple times until a reasonable maximum desired length of line has been measured, and a reasonable number of data pairs have been recorded. (318)

Calibration—Store Calibration Data

The calibration data 262, comprising the multiple length 514 and angle 516 pairs, the angler-defined name 504, the boat speed 510, and the description of the rig 512 is stored in persistent storage 210 so that it can later be retrieved and reused in another subsequent trolling session without the need to recalibrate. (320)

The calibration data 262 may be edited to add more length-angle pairs, or to delete inaccurate measurements.

Analysis Phase

In an analysis phase performed after the calibration phase and before the trolling phase, the calibration data 262 is used by the analysis module 256 to compute a curve data set 264 which is an approximation to the actual fishing line's profile curve 106. (334)

The curve data set may consist of a sequence of curved line segments, each of which is derived from the measured calibration line lengths 112 and line angles 110. The curve data 264 may consist of a single curve which best fits all the measured line lengths 112 and angles 110, or it may consist of multiple curves each of which fits one or more calibration line lengths 112 and angles 110.

If any of the line length 514 and angle 516 pairs of the calibration data 262 are invalid or inconsistent, such that the analysis does not complete correctly, the analysis module 265 will display an error message. The angler may edit the calibration data 262 by deleting invalid length-angle pairs or adding new pairs, and the analysis phase may be re-executed.

The computed curve data 264 may be stored in persistent storage 210, to be used in the trolling phase in the current session or in another later session, or the curve data 264 may be reanalyzed from the calibration data 262 before each trolling phase.

Trolling Phase

In the trolling phase, the angler invokes the user interface for trolling 530. The angler enters the current rod tip height 534 to be used while trolling. (344)

The angler specifies the desired depth 536 at which the angler wishes to troll the terminal tackle 108. (346)

The user interface to specify the desired depth 536 may be implemented as one of a variety of user interface components, such as
- a slider widget 540 (shown),
- a numerical input field (not shown),
- a rolling number widget (not shown),
- A cursor or touchscreen input directly on the display of a marine depth-finder (not shown), or
- others.

As the angler enters or changes the desired depth 536, the corresponding line count value 538 required to reach the desired depth 536 is calculated or looked up by algorithms or formulas which use the curve data 264, and then displayed to the angler. (348)

The angler then releases or recovers line 106 so that the line count value 538 is displayed by the line counter of the reel 105 and continues to troll. (352)

At any time, without additional calibration, the angler may specify a new trolling depth 536, obtain the corresponding line count 538, and adjust the fishing line 106 accordingly. (354)

Alternative Embodiments

Calibration Alternative—Speed Measurement

Alternatively, the angler may obtain the boat speed from the boat's marine electronics, the boat's speedometer, or other means, and may manually fill the boat speed 510 field of the user interface for calibration 500.

Calibration Alternative—Determine Line Length without Reel's Line Counter

Alternatively, the angler may determine the line length 514 by another technique, such as counting reel handle revolutions, counting level-winder traversals, counting manual line pulls, counting line color changes, observing a pre-marked line, or others, then enter the line length into the line length field 514.

The angler may also use a commercially available line counter that is not incorporated with the reel 105.

Calibration Alternative—Measure Line Angle Electronically FIG. 6a, 6b

Alternatively, a wireless fishing line inclinometer 602 may be used to measure the line angle 110. A wireless fishing line inclinometer 602 is a device which attaches to the fishing rod 104 and fishing line 106 and holds a wireless electronic inclinometer 604 (prior art) parallel to the fishing line 106. The wireless electronic inclinometer 604 automatically transmits the line angle 110 to the computing device 200 over a wireless signal 630, so the angler does not need to manually enter the line angle 516.

Calibration Alternative—Measure Line Length Electronically FIG. 6b

Alternatively, a fishing reel with a wireless line counter (prior art, not shown) or a separate wireless line counter 620 may be used to automatically transmit the line length to the computing device 200, so the angler does not need to manually enter the line length 514.

In this embodiment, the computing device 200 can be a mounted marine electronics unit, such as a fish-finder, chart-plotter, radar system, or combination. It needs no additional sensors 230 except the wireless radio receiver 220.

Calibration Alternative—Measure Line Angle Manually

Alternatively, the line angle 110 can be measured with a mechanical inclinometer 650 (prior art) or by other means and manually entered into the line angle field 516. A simple mechanical inclinometer serving this purpose is shown in FIG. 6c.

Analysis and Trolling Alternative—Adjustments to Curve Data

The calibration data 262, if measured accurately, will be sufficient to derive reasonably accurate curve data 264, and in particular will result in curve data 264 which represents the general shape of the actual trolled fishing line. The implementation of an embodiment may also allow the angler to make adjustments based on real-world performance, for example to reduce or increase the depth by a percentage amount entered by the angler.

Conclusion, Ramifications, and Scope

Usefulness

Fishing is a complex endeavor. Presentation factors, like size, action, color, flash, sound, smell, can entice a fish to strike, but first the lure needs to be presented close enough for the fish to perceive it. Location is arguably the most important factor in fishing success. The underwater environment is three-dimensional, and anglers have always had some knowledge and control over their surface location, and have always roughly estimated presentation depth. With modern fish-finders and chart-plotters, the three-dimensional location of fish can often be determined with very high precision, and the two-dimensional surface location and path of a trolling run can be planned and determined accurately too. One can often observe fish on a fish finder at a consistent particular depth. But to easily and accurately determine terminal tackle depth while trolling, in the general case for any terminal tackle configuration, remains elusive. The embodiments described in the present application directly address this need.

Solution

The described method exploits the observation that
- a line angle can be measured at a point of a moving submersed line when the point is near the surface, and that the line at that point has the same angle after the line has been lowered into the water, so that a plurality of angles can be known at different line lengths, and that this information is enough to fully determine a curve approximation.

This phenomenon is exploited here in a particular domain (fishing) by embodiments that use particular devices in combination (computing device, software, sensors, inclinometer, line counter, and of course, line, rod, reel, terminal tackle, boat).

Novelty

All embodiments described differ substantially from any discovered prior art or practice. No prior art was discovered which uses multiple measured line angles and lengths to compute a true curve representing a full trolled fishing line.

Conceptually, the present invention is an extension and improvement of prior patented mechanical devices, such as that described by Swan and others, which measure and use a single line length and angle in conjunction with a table or chart derived with simple trigonometry.

The present invention differs substantially from U.S. Pat. No. 7,113,449 Fairbairn, which does not use or reference measured line angles, as does the method described in this application. The present invented method does not require a database of lure types as does Fairbairn. The present invention generates all data structures from line lengths and depths found by measurements made by the angler using the method.

Computing Software is Required for Practical Analysis

A single line angle and length with a two-dimensional chart or table described in several prior art can provide results only for problems with two degrees of freedom.

The present described method provides as input to analysis an arbitrary plurality of such line lengths and angles representing a corresponding plurality of segments of the entire line. This leads to a single mathematical problem with many constraints and degrees of freedom or to multiple separate simpler problems. These problems can theoretically be solved or approximated as a whole or piecewise, analytically, numerically, or even geometrically, with pencil and paper, but even the simplest solution is impractical for an average angler in a boat to calculate. However, it is very easy for an angler with appropriate computing software to measure this data and solve this problem.

Equipment

Each embodiment requires trolling fishing equipment, a computing device with software, and a means to measure line angles and line lengths.

A typical modern smartphone supplies all the computing device's embedded hardware components which are required to support any described embodiment of the present invented method. The software application may be supplied as a smartphone app.

Some embodiments of the method require fewer embedded sensor components and could be executed with an external inclinometer and a different computing device for example, a personal computer, a marine electronics unit, a special-purpose electronic device, or a remote computer server with a local web interface.

No Extra Apparatus Required for Some Embodiments

The ability to measure fishing line angles with a smartphone and its app and to perform the analysis on the smartphone app is an advantage over prior patented or commercial devices, since no extra equipment is required beyond a smartphone.

Wireless Embodiment is Very Convenient

The alternative embodiment described which uses a wireless inclinometer is very user-friendly, as the angler does not need to measure or enter the line angle. The angle is measured and obtained automatically, which eliminates error and takes much less time.

If a wireless line counter is used too, there is no data entry by the angler required at all for the calibration length and angle pairs.

This embodiment can be supported by software in a boat-mounted marine electronics unit, with for example Bluetooth wireless capability, or in another computing device.

Non-Trolling Usage

This method in some embodiments can be used to fish in ways other than trolling, for example fishing in a moving current from an anchored boat or from a stationary position. However, results will be reliable only if the current is a constant velocity for the whole depth of the fishing line.

Scope

The invention has been described in detail with particular reference to several alternative embodiments, but these should not be interpreted as limitations on the scope, but rather as an exemplification of several embodiments thereof. Many other variations and modifications are possible within the spirit and scope of the invention as described. Accordingly, the scope should be determined not by the embodiments illustrated or described, but by the appended claims and their legal equivalents.

What is claimed is:

1. A method for determining a line length required to troll a terminal tackle at a predetermined depth comprising:
   a. adjusting a fishing line rigged with said terminal tackle to a plurality of different calibration line lengths, so that said terminal tackle is submerged and trolled, and
   b. measuring a calibration line angle at a water surface position for each said calibration line length respectively, and
   c. computing curve data wherein each said calibration line angle is assumed to remain unchanged as said fishing line is deployed deeper, and wherein said curve data consists of a sequence of one or more curve segments each with a segment length derived from said calibration line lengths and with slopes derived from said calibration line angles and
   d. using said curve data to derive and display said required line length for said predetermined depth, whereby
   e. setting said line rigged with said terminal tackle to said required line length will cause said terminal tackle to be trolled at approximately the said predetermined depth.

2. A means for determining a required line length to troll a terminal tackle at a predetermined depth,
   a. wherein said terminal tackle is attached to a fishing line, and comprising
   b. a means for measuring and recording calibration data, wherein said calibration data comprises a plurality of pairs of calibration line length and calibration line angle, wherein each said calibration line angle is measured at a water surface position of said fishing line, and
   c. a computing device, and
   d. a software program executing on said computing device wherein said software program provides a means for using said calibration data to derive curve data wherein each said calibration line angle is assumed to remain unchanged as said fishing line is deployed deeper, and wherein said curve data consists of a sequence of one or more curve segments each with a segment length derived from said calibration line lengths and with slopes derived from said calibration line angles, and wherein said curve data is used to derive and display said required line length for said predetermined depth, whereby
   e. adjusting said line rigged with said terminal tackle to said required line length will cause said terminal tackle to be trolled at approximately the said predetermined depth.

3. A means for determining a required line length to troll a terminal tackle at a predetermined depth of claim 2, wherein said fishing line is deployed from a fishing rod, also including
   a. a device for measuring said calibration line angles, comprising
   b. a rigid bar, with a first end and a second end, and
   c. an electronic wireless inclinometer mounted to said bar near said first end of said bar, and
   d. a hangar attached to said bar at the balance point of said device, which hangar may be releasably attached to said fishing rod, and
   e. a line guide attached to said bar near the said second end of said bar, which said line guide may be releasably attached to said fishing line, so that
   f. said fishing line may slide freely through said line guide, and so that
   g. said wireless electronic inclinometer is urged parallel to said fishing line, whereby
   h. said wireless inclinometer may transmit said calibration angle of said fishing line to said computing device.

4. A means for measuring a line angle of a deployed fishing line wherein said fishing line is deployed from a fishing rod, comprising
   a. a rigid bar, with a first end and a second end, and
   b. an electronic wireless inclinometer mounted to said bar near said first end of said bar, and
   c. a hangar attached to said bar at or near the balance point of said device, which said hangar may be releasably attached to said fishing rod, and
   d. a line guide attached to said bar near the said second end of said bar, which said line guide may be releasably attached to said fishing line, so that
   e. said fishing line may slide freely through said line guide, and so that
   f. said wireless electronic inclinometer is urged parallel to said fishing line, whereby
   g. said wireless inclinometer may transmit said line angle of said fishing line to a computing device.

* * * * *